US012798424B2

(12) United States Patent
Kato

(10) Patent No.: US 12,798,424 B2
(45) Date of Patent: Nov. 17, 2026

(54) CHARGING DEVICE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 328 days.

(21) Appl. No.: 18/627,196

(22) Filed: Apr. 4, 2024

(65) Prior Publication Data

US 2024/0343150 A1 Oct. 17, 2024

(30) Foreign Application Priority Data

Apr. 17, 2023 (JP) ................................ 2023-066932

(51) Int. Cl.
*B60L 53/62* (2019.01)
*B60L 53/66* (2019.01)
*H02J 7/90* (2026.01)
*B60L 53/10* (2019.01)

(52) U.S. Cl.
CPC ............... *B60L 53/62* (2019.02); *B60L 53/66* (2019.02); *H02J 7/933* (2026.01); *B60L 53/11* (2019.02); *B60L 2250/00* (2013.01)

(58) Field of Classification Search
None
See application file for complete search history.

(56) References Cited

U.S. PATENT DOCUMENTS

2012/0290506 A1* 11/2012 Muramatsu ........ G01C 21/3679 701/400
2013/0009599 A1* 1/2013 Yukizane ................ B60L 53/11 320/109
2013/0035804 A1* 2/2013 Nakazawa .............. B60L 53/63 701/1
2013/0226441 A1* 8/2013 Horita ................ G01C 21/3469 701/117
2013/0261953 A1* 10/2013 Kiyama ............. G01C 21/3469 701/400
2013/0335005 A1* 12/2013 Ohama ..................... B60L 3/12 320/106
2014/0253034 A1* 9/2014 Kurimoto ............... B60L 50/16 320/109

(Continued)

FOREIGN PATENT DOCUMENTS

JP 2013-153604 A 8/2013

*Primary Examiner* — Hua Lu
(74) *Attorney, Agent, or Firm* — Rimon P.C.

(57) ABSTRACT

A charging device includes a charger, a determiner, and a control processor. The charger is configured to charge a storage battery of a vehicle in a normal charging mode or a quick charging mode. The determiner is configured to determine whether a state of charge of the storage battery when the storage battery is charged in the normal charging mode is to reach a predetermined state of charge within an available time period for the storage battery. The control processor is configured to set a charging mode of the charger to the normal charging mode or the quick charging mode, and set the charging mode of the charger to the normal charging mode when the determiner determines that the state of charge of the storage battery is to reach the predetermined state of charge.

9 Claims, 8 Drawing Sheets

(56) References Cited

U.S. PATENT DOCUMENTS

| | | | | |
|---|---|---|---|---|
| 2014/0347017 | A1* | 11/2014 | Sugano | B60L 1/003 320/137 |
| 2015/0306961 | A1* | 10/2015 | Strasser | B60L 58/12 180/65.21 |
| 2019/0126766 | A1* | 5/2019 | Taguchi | B60L 53/14 |
| 2019/0248251 | A1* | 8/2019 | Park | B60L 50/50 |
| 2019/0291600 | A1* | 9/2019 | Takemoto | B60L 53/62 |
| 2020/0094703 | A1* | 3/2020 | Ohtomo | B60L 53/62 |
| 2020/0380429 | A1* | 12/2020 | Kawamoto | G06Q 10/02 |
| 2021/0156703 | A1* | 5/2021 | Jin | G07C 5/004 |
| 2021/0276447 | A1* | 9/2021 | Kumar | B60L 53/66 |
| 2022/0056672 | A1* | 2/2022 | Nomura | B60K 35/22 |
| 2022/0108248 | A1* | 4/2022 | Oobayashi | G06Q 10/06315 |
| 2022/0153163 | A1* | 5/2022 | Murai | B60L 53/60 |
| 2022/0187091 | A1* | 6/2022 | Suzuki | B60L 53/60 |
| 2022/0245550 | A1* | 8/2022 | Nakata | B60L 58/10 |
| 2022/0393491 | A1* | 12/2022 | Zhang | B60L 53/53 |
| 2022/0402397 | A1* | 12/2022 | Nishimura | B60L 53/36 |
| 2023/0264705 | A1* | 8/2023 | Nakano | B60W 50/10 701/1 |
| 2023/0398890 | A1* | 12/2023 | Hanashima | B60L 53/305 |
| 2024/0025301 | A1* | 1/2024 | Park | H01M 10/63 |
| 2024/0042883 | A1* | 2/2024 | Sugiyama | B60L 53/62 |
| 2024/0047975 | A1* | 2/2024 | Li | A01D 34/78 |
| 2024/0140239 | A1* | 5/2024 | Anand | B60L 53/62 |
| 2024/0317091 | A1* | 9/2024 | Carter | B60L 50/11 |
| 2025/0053906 | A1* | 2/2025 | Fescioglu-Unver | B60L 53/305 |
| 2025/0055306 | A1* | 2/2025 | Lv | H02J 7/342 |
| 2025/0130287 | A1* | 4/2025 | Shimizu | G01R 31/392 |
| 2025/0165876 | A1* | 5/2025 | Okada | B60L 53/60 |

* cited by examiner

CHARGING DEVICE

CROSS-REFERENCE TO RELATED APPLICATIONS

The present application claims priority from Japanese Patent Application No. 2023-066932 filed on Apr. 17, 2023, the entire contents of which are hereby incorporated by reference.

BACKGROUND

The disclosure relates to a charging device.

In recent years, electric vehicles and plug-in hybrid electric vehicles equipped with a storage battery that is chargeable by an external power source have been widely used from a viewpoint of environmental protection.

Because time to be taken to charge an electric vehicle or a plug-in hybrid electric vehicle is generally long, the storage battery is to be charged efficiently.

For example, Japanese Unexamined Patent Application Publication (JP-A) No. 2013-153604 discloses a technique in which a storage battery is charged by quick charging with charging power higher than that of normal charging to shorten a queuing time.

SUMMARY

An aspect of the disclosure provides a charging device that includes a charger, a determiner, and a control processor. The charger is configured to charge a storage battery of a vehicle in a normal charging mode or a quick charging mode. The determiner is configured to determine whether a state of charge of the storage battery when the storage battery is charged in the normal charging mode is to reach a predetermined state of charge within an available time period for the storage battery. The control processor is configured to set a charging mode of the charger to the normal charging mode or the quick charging mode, and set the charging mode of the charger to the normal charging mode when the determiner determines that the state of charge of the storage battery is to reach the predetermined state of charge.

An aspect of the disclosure provides a charging device that includes one or more processors, one or more memories, and a charger. The one or more memories are communicably coupled to the one or more processors. The charger is configured to charge a storage battery of a vehicle in a normal charging mode or a quick charging mode. The one or more processors are configured to: determine whether a state of charge of the storage battery when the storage battery is charged in the normal charging mode is to reach a predetermined state of charge within an available time period for the storage battery; set a charging mode of the charger to the normal charging mode or the quick charging mode; and set the charging mode of the charger to the normal charging mode when the state of charge of the storage battery is determined to reach the predetermined state of charge.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to describe the principles of the disclosure.

DETAILED DESCRIPTION

Figure 1:
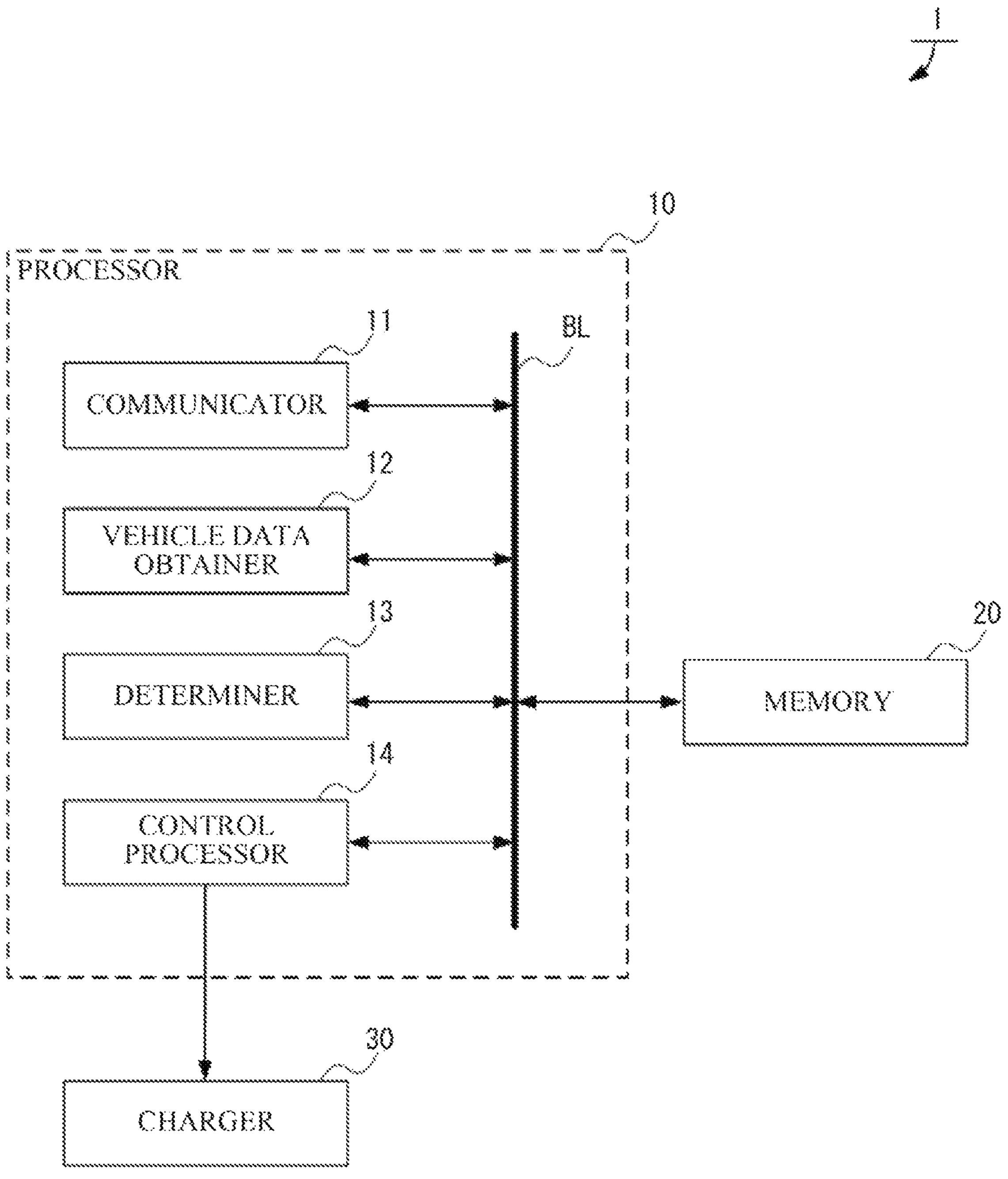
FIG. 1 is a diagram illustrating a configuration of a charging device according to one example embodiment of the disclosure.

In general, when a storage battery of a vehicle is charged by quick charging, a current larger than that of normal charging is supplied to the storage battery to perform charging. This may possibly cause a temperature of the storage battery itself to become high and accelerate deterioration of the storage battery.

Despite the fact, in a technique described in JP-A No. 2013-153604, a storage battery is always charged by quick charging regardless of an available time period of a charging device, which may possibly accelerate deterioration of the storage battery.

It is desirable to provide a charging device that makes it possible to suppress deterioration of a storage battery.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Charging devices 1, 1A, 1B, and 1C according to example embodiments of the disclosure will now be described with reference to FIGS. 1 to 8.

First Example Embodiment

The charging device 1 according to a first example embodiment will now be described with reference to FIGS. 1 and 2.

<Configuration of Charging Device 1>

Figure 2:
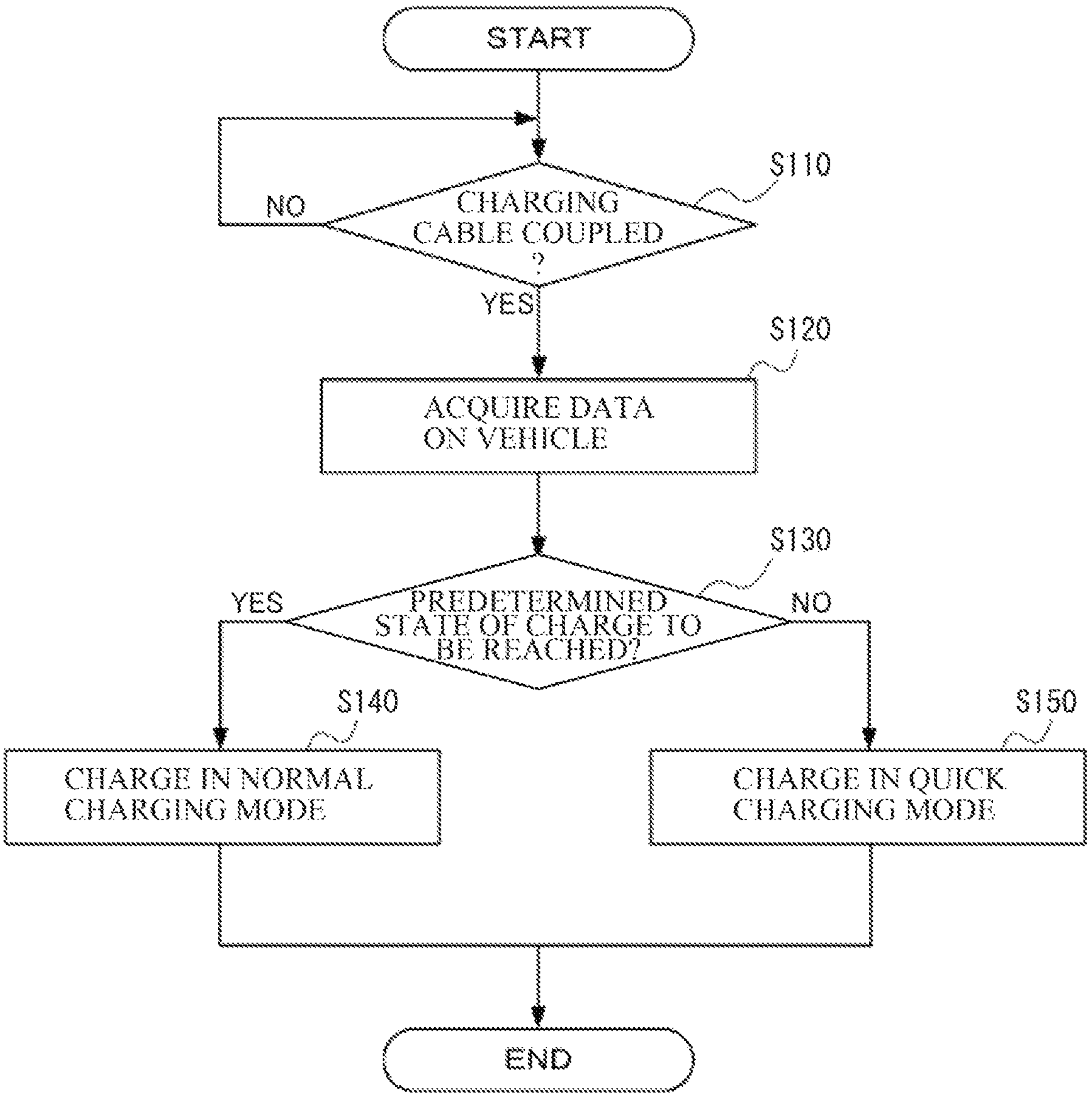
FIG. 2 is a flowchart illustrating a process to be executed by the charging device illustrated in FIG. 1.

As illustrated in FIG. 1, the charging device 1 according to the first example embodiment may include a processor 10, a memory 20, and a charger 30.

Note that the processor 10 will be described later.

The memory 20 may include, for example, a read-only memory (ROM) and a random-access memory (RAM). The ROM may store, for example, a control program. The RAM may store, for example, various kinds of data received from the processor 10.

The charger 30 charges a storage battery of a vehicle in a normal charging mode or a quick charging mode.

In the normal charging mode, the charger 30 may charge the storage battery with, for example, a charging power less than 10 kW.

Further, in the quick charging mode, the charger 30 may charge the storage battery with a charging power higher than or equal to 50 kW.

The charger 30 may switch between the normal charging mode and the quick charging mode in accordance with an instruction from the processor 10 to charge the storage battery. In one embodiment, the charger 30 may serve as a "charger".

<Configuration of Processor 10>

The processor 10 may include a communicator 11, a vehicle data obtainer 12, a determiner 13, and a control processor 14.

The components of the processor 10 and the memory 20 may transmit and receive various kinds of data through a bus line BL.

When a charging cable is coupled to a vehicle to be charged, the communicator 11 may establish communication such as a controller area network (CAN) communication or a power line communication (PLC) with an electronic control unit (ECU) of the vehicle through the charging cable. The communicator 11 may serve as an interface that transmits and receives data on charging.

In the first example embodiment, the communicator 11 may serve as, for example, an interface that acquires data on the vehicle.

The vehicle data obtainer 12 may acquire data on the vehicle to be charged.

Non-limiting examples of the data on the vehicle may include a charge amount at the time of full charge, a current remaining charge amount, a current state of charge, and whether the vehicle is an automated driving vehicle or other than an automated driving vehicle.

The vehicle data obtainer 12 may be coupled to the ECU of the vehicle through the communicator 11, and acquire the data on the vehicle.

The vehicle data obtainer 12 may store the acquired data on the vehicle in the memory 20 through the bus line BL.

Note that the vehicle data obtainer 12 may continuously acquire the data on the vehicle even during a period in which the charger 30 is charging the vehicle, and store the acquired data in the memory 20.

The determiner 13 determines whether a state of charge of the storage battery when the vehicle is charged in the normal charging mode is to reach a predetermined state of charge within an available time period.

The above-described available time period may be a predetermined time period during which the charging device 1 is available to be used for charging. The available time period may be set to, for example, 20 minutes.

The state of charge of the storage battery described above may be a value indicating the state of charge of the storage battery. The state of full charge may be defined as 100%, and the state of complete discharge may be defined as 0%.

The determiner 13 may determine whether the state of charge of the storage battery is to reach the predetermined state of charge, based on the charge amount to be charged when the storage battery is charged in the normal charging mode within the available time period and the data on the vehicle stored in the memory 20. The data on the vehicle may include the charge amount at the time of full charge, the current remaining charge amount, and the current state of charge.

Note that the predetermined state of charge described above may be a value at which a user is allowed to drive without worrying about the remaining charge amount of the storage battery of the vehicle. The predetermined state of charge may be set to a value such as 80% or higher.

The determiner 13 may transmit a result of the determination to the control processor 14, which will be described later, through the bus line BL.

The control processor 14 may control an overall operation of the charging device 1 in accordance with the control program stored in the memory 20.

The control processor 14 may determine, for example, whether the charging cable has been coupled to the vehicle.

The control processor 14 may determine that the charging cable has been coupled to the vehicle when, for example, the control processor 14 is coupled to the vehicle through the communicator 11 and the charging cable, and communication with the vehicle is established.

In the first example embodiment, the control processor 14 performs control to set a charging mode of the charger 30 to the normal charging mode or the quick charging mode.

When the determiner 13 determines that the state of charge of the storage battery is to reach the predetermined state of charge, the control processor 14 performs control to set the charging mode of the charger 30 to the normal charging mode.

In contrast, when the determiner 13 determines that the state of charge of the storage battery is not to reach the predetermined state of charge, the control processor 14 may perform control to set the charging mode of the charger 30 to the quick charging mode.

For example, when a result of the determination indicating that the state of charge of the storage battery is to reach the predetermined state of charge is received from the determiner 13, the control processor 14 may transmit an instruction to charge the storage battery in the normal charging mode to the charger 30. When a result of the determination indicating that the state of charge of the storage battery is not to reach the predetermined state of charge is received from the determiner 13, the control processor 14 may transmit an instruction to charge the storage battery in the quick charging mode to the charger 30.

The control processor 14 may transmit the instructions described above to the charger 30 through the bus line BL. In one embodiment, the determiner 13 may serve as a "determiner". In one embodiment, the control processor 14 may serve as a "control processor".

<Process to be Executed by Charging Device 1>

The process to be executed by the charging device 1 will be described with reference to FIG. 2.

The control processor 14 may determine whether the charging cable has been coupled to the vehicle (step S110).

When it is determined that the charging cable has not been coupled to the vehicle ("NO" in step S110), the control processor 14 may cause the process to return and shift to a standby mode.

In contrast, when the control processor 14 determines that the charging cable has been coupled to the vehicle ("YES" in step S110), the vehicle data obtainer 12 may acquire the data on the vehicle from the vehicle (step S120).

The determiner 13 may refer to the data on the vehicle acquired in step S120, and determine whether the predetermined state of charge is to be reached (step S130).

When the determiner 13 determines that the predetermined state of charge is to be reached ("YES" in step S130), the control processor 14 may transmit the instruction to charge the storage battery in the normal charging mode to the charger 30 (step S140), and end the process.

In contrast, when the determiner 13 determines that the predetermined state of charge is not to be reached ("NO" in step S130), the control processor 14 may transmit the instruction to charge the storage battery in the quick charging mode to the charger 30 (step S150), and end the process.

Workings and Example Effects

As described above, the charging device 1 according to the first example embodiment includes the charger 30, the determiner 13, and the control processor 14. The charger 30 charges the storage battery of the vehicle in the normal charging mode or the quick charging mode. The determiner 13 determines whether the state of charge of the storage battery when the storage battery is charged in the normal charging mode is to reach the predetermined state of charge within the available time period. The control processor 14 sets the charging mode of the charger 30 to the normal charging mode or the quick charging mode.

When the determiner 13 determines that the state of charge of the storage battery is to reach the predetermined state of charge, the control processor 14 performs control to set the charging mode of the charger 30 to the normal charging mode.

For example, when it is determined that the state of charge of the storage battery when the storage battery is charged in the normal charging mode is to reach the predetermined state of charge within the available time period, the charging device 1 may determine that the storage battery is not to be charged in the quick charging mode, and charge the storage battery in the normal charging mode.

Accordingly, in a case where the state of charge of the storage battery when the storage battery is charged in the normal charging mode is to reach the predetermined state of charge within the available time period, the storage battery may be charged in the normal charging mode. This helps to suppresses deterioration of the storage battery.

Further, even when the storage battery is charged in the normal charging mode, the state of charge of the storage battery is to reach the predetermined state of charge.

This helps the user to drive the vehicle without worrying about the remaining charge amount of the storage battery of the vehicle.

Second Example Embodiment

The charging device 1A according to a second example embodiment will be described with reference to FIGS. 3 and 4.

Components denoted with the same reference numerals as those in the first example embodiment may have similar operations, and detailed descriptions thereof will be omitted.

<Configuration of Charging Device 1A>

Figure 3:
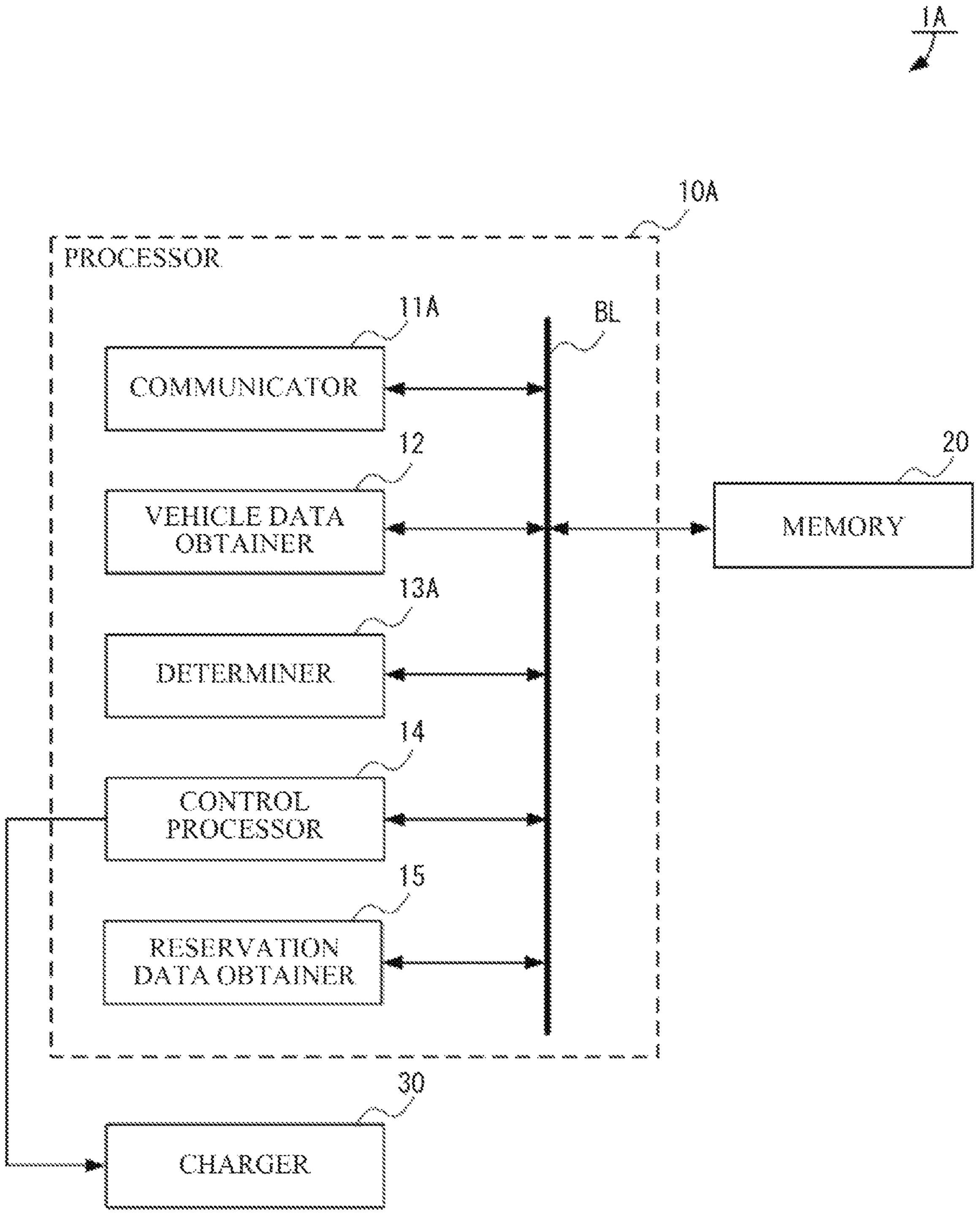
FIG. 3 is a diagram illustrating a configuration of a charging device according to one example embodiment of the disclosure.
Figure 4:
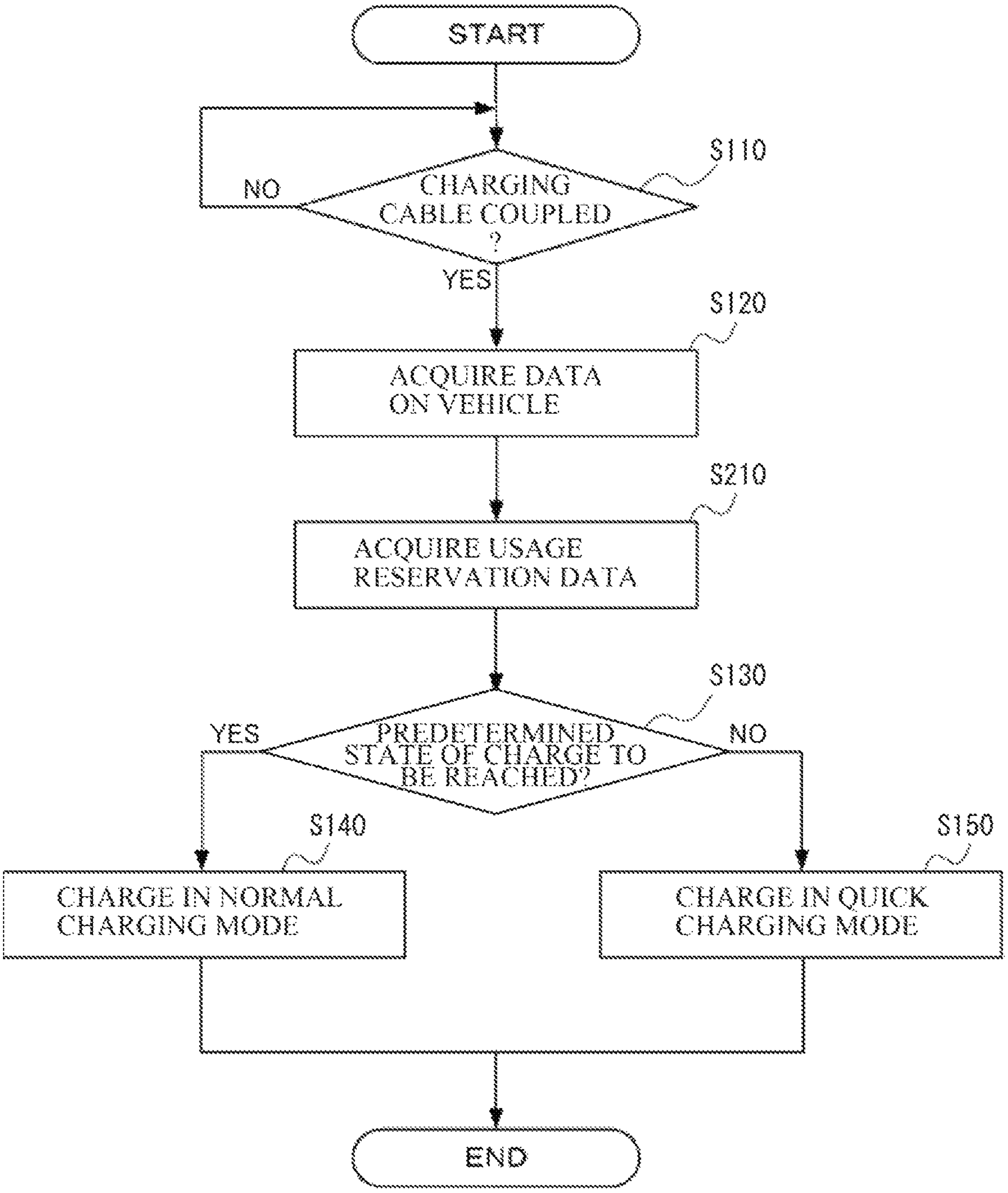
FIG. 4 is a flowchart illustrating a process to be executed by the charging device illustrated in FIG. 3.

As illustrated in FIG. 3, the charging device 1A according to the second example embodiment may include a processor 10A, the memory 20, and the charger 30.

<Configuration of Processor 10A>

The processor 10A may include a communicator 11A, the vehicle data obtainer 12, a determiner 13A, the control processor 14, and a reservation data obtainer 15.

When the charging cable is coupled to the vehicle to be charged, the communicator 11A may establish communication such as a controller area network (CAN) communication or a power line communication (PLC) with the electronic control unit (ECU) of the vehicle through the charging cable. The communicator 11A may serve as an interface that transmits and receives data on charging.

In the second example embodiment, the communicator 11A may serve as, for example, an interface that acquires the data on the vehicle.

The communicator 11A may include a wireless communication module that is couplable to an Internet network. The communicator 11A may serve as an interface used to acquire data from a server coupled to the Internet network.

In the second example embodiment, the communicator 11A may be coupled to the server coupled to the Internet network and serve as an interface used to acquire usage reservation data.

The reservation data obtainer 15 may acquire the usage reservation data.

The reservation data obtainer 15 may be coupled to the server in which the usage reservation data is stored through the communicator 11A, and acquire the usage reservation data.

Note that when the user makes a reservation for usage of the charging device 1A, for example, the user may cause a device such as a smartphone carried by the user to be coupled to the above-described server, select a reservable date and time, and make a reservation for usage.

Non-limiting examples of the usage reservation data stored in the server described above may include data on a person who made the reservation, reservation date, a usage start time, and a usage end time.

The reservation data obtainer 15 may store the acquired usage reservation data in the memory 20 through the bus line BL.

Note that the reservation data obtainer 15 may continuously acquire the usage reservation data from the server and store the latest usage reservation data in the memory 20 because there is a possibility that the usage reservation data is updated due to factors such as cancellation of a reservation and addition of a new reservation. In one embodiment, the reservation data obtainer 15 may serve as a "data obtainer".

The determiner 13A may determine whether the state of charge of the storage battery when the storage battery is charged in the normal charging mode is to reach the predetermined state of charge within the available time period.

In the second example embodiment, the determiner 13A may determine whether the state of charge of the storage battery when the storage battery is charged in the normal charging mode is to reach the predetermined state of charge within the available time period that is determined based on the usage reservation data.

The determiner 13A may acquire the usage start time of a next user from the memory 20 through the bus line BL. The determiner 13A may determine whether the state of charge of the storage battery is to reach the predetermined state of charge when the storage battery is charged in the normal charging mode in a time period from a current time to the usage start time of the next user.

For example, the determiner 13A may determine whether the state of charge of the storage battery is to reach the predetermined state of charge, based on the charge amount to be charged when the storage battery is charged in the normal charging mode until the usage start time of the next user and the data on the vehicle stored in the memory 20. The data on the vehicle may include the charge amount at the time of full charge, the current remaining charge amount, and the current state of charge.

Note that the predetermined state of charge described above may be a value at which the user is allowed to drive without worrying about the remaining charge amount of the storage battery of the vehicle. The predetermined state of charge may be set to a value such as 80% or higher.

The determiner 13A may transmit a result of the determination to the control processor 14 through the bus line BL.

<Process to be Executed by Charging Device 1A>

A process to be executed by the charging device 1A will be described with reference to FIG. 4.

The control processor 14 may determine whether the charging cable has been coupled to the vehicle (step S110).

When it is determined that the charging cable has not been coupled to the vehicle ("NO" in step S110), the control processor 14 may cause the process to return and shift to a standby mode.

In contrast, when the control processor 14 determines that the charging cable has been coupled to the vehicle ("YES" in step S110), the vehicle data obtainer 12 may acquire the data on the vehicle from the vehicle (step S120).

The reservation data obtainer 15 may acquire the usage reservation data from the server (step S210), and cause the process to shift to step S130.

The determiner 13A may refer to the data acquired in steps S120 and S210, and determine whether the predetermined state of charge is to be reached (step S130).

When the determiner 13A determines that the predetermined state of charge is to be reached ("YES" in step S130), the control processor 14 may transmit the instruction to charge the storage battery in the normal charging mode to the charger 30 (step S140), and end the process.

In contrast, when the determiner 13A determines that the predetermined state of charge is not to be reached ("NO" in step S130), the control processor 14 may transmit the instruction to charge the storage battery in the quick charging mode to the charger 30 (step S150), and end the process.

Workings and Example Effects

In some embodiments, the charging device 1A may include the reservation data obtainer 15 configured to acquire the usage reservation data. The available time period may be determined based on the usage reservation data.

For example, when it is determined that the state of charge of the storage battery when the storage battery is charged in the normal charging mode is to reach the predetermined state of charge within the time period from the current time to the usage start time of the next user, the charging device 1A may determine that the storage battery is not to be charged in the quick charging mode, and charge the storage battery in the normal charging mode.

Accordingly, in a case where the state of charge of the storage battery when the storage battery is charged in the normal charging mode is to reach the predetermined state of charge within the time period from the current time to the usage start time of the next user, the storage battery may be charged in the normal charging mode. This helps to suppress deterioration of the storage battery.

Further, even when the storage battery is charged in the normal charging mode, the state of charge of the storage battery is to reach the predetermined state of charge.

This helps the user to drive the vehicle without worrying about the remaining charge amount of the storage battery of the vehicle.

Third Example Embodiment

The charging device 1B according to a third example embodiment will be described with reference to FIGS. 5 and 6.

Components denoted with the same reference numerals as those in the first example embodiment and the second example embodiment may have similar operations, and detailed descriptions thereof will be omitted.

<Configuration of Charging Device 1B>

Figure 5:
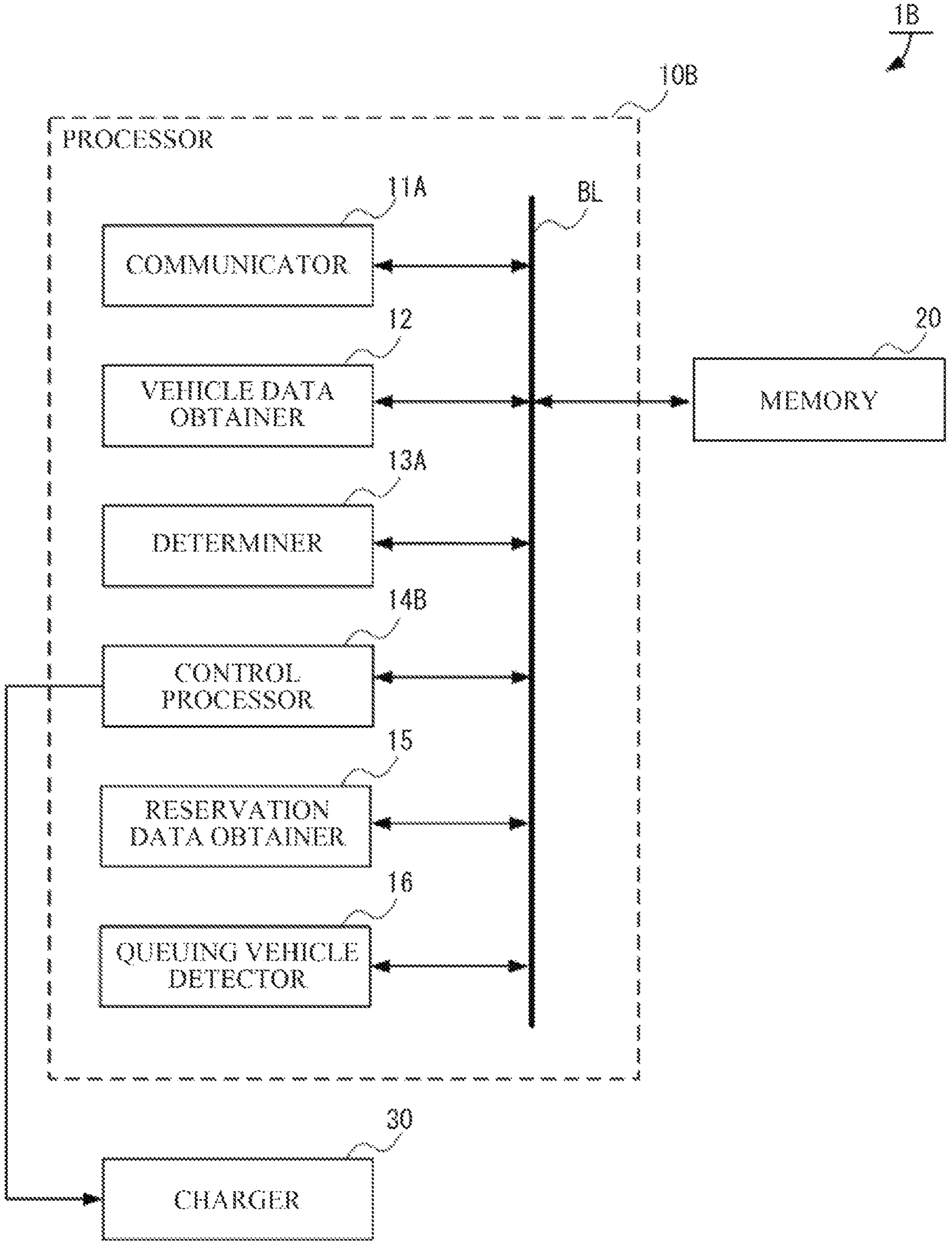
FIG. 5 is a diagram illustrating a configuration of a charging device according to one example embodiment of the disclosure.
Figure 6:
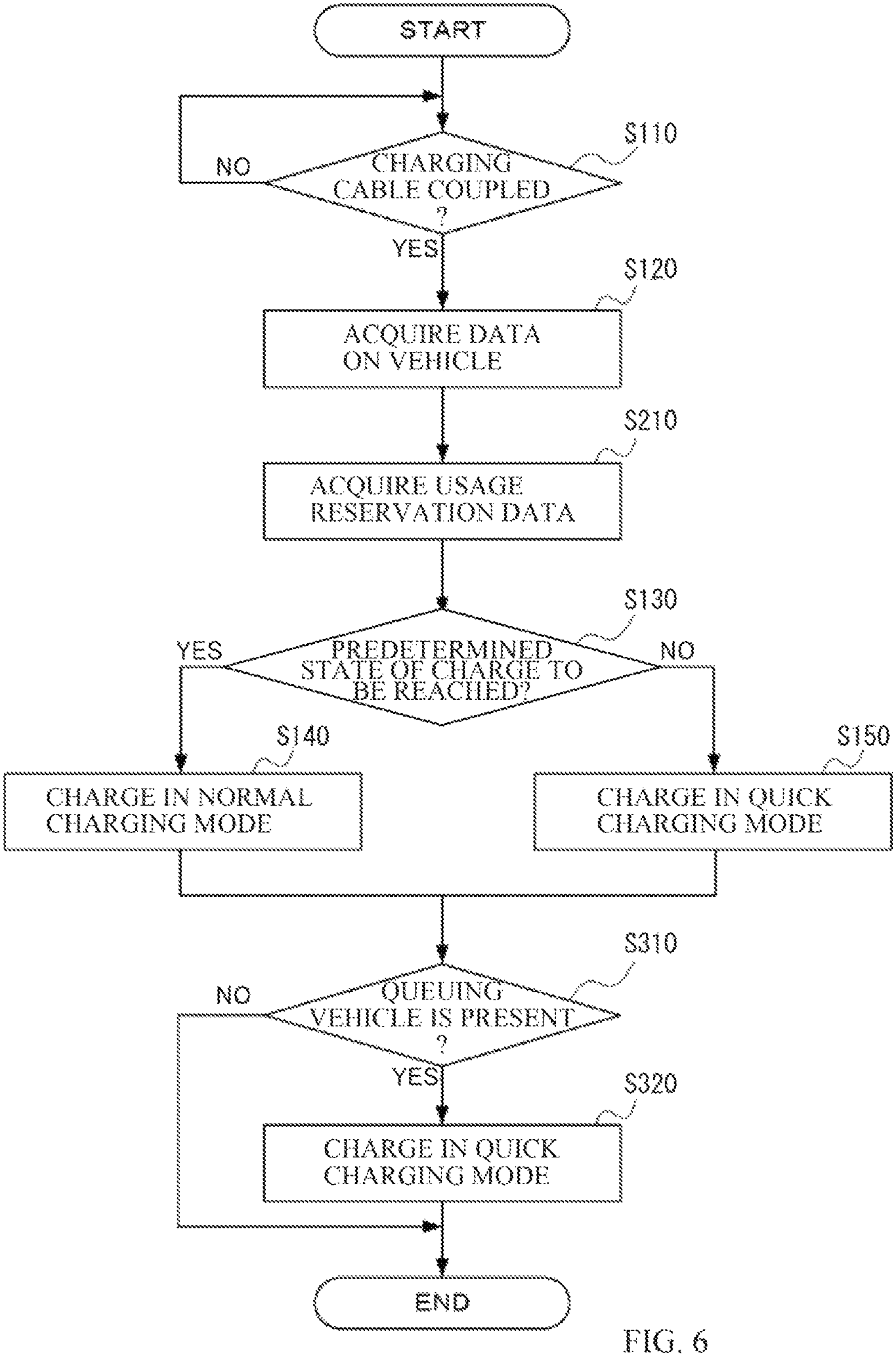
FIG. 6 is a flowchart illustrating a process to be executed by the charging device illustrated in FIG. 5.

As illustrated in FIG. 5, the charging device 1B according to the third example embodiment may include a processor 10B, the memory 20, and the charger 30.

<Configuration of Processor 10B>

The processor 10B may include the communicator 11A, the vehicle data obtainer 12, the determiner 13A, a control processor 14B, the reservation data obtainer 15, and a queuing vehicle detector 16.

The queuing vehicle detector 16 may detect a queuing vehicle.

The queuing vehicle detector 16 may detect whether the queuing vehicle is present, for example, based on an image obtained by capturing a queuing area that is in the vicinity of the charging device 1B.

When the queuing vehicle detector 16 detects that the queuing vehicle is present, the queuing vehicle detector 16 may transmit data indicating that the queuing vehicle has been detected to the control processor 14B through the bus line BL.

Note that the queuing vehicle detector 16 may use any detection method as long as the queuing vehicle detector 16 detects the queuing vehicle waiting for the charging device 1B to be available. In one embodiment, the queuing vehicle detector 16 may serve as a "vehicle detector".

The control processor 14B may perform control to set the charging mode of the charger 30 to the normal charging mode or the quick charging mode.

When the determiner 13A determines that the state of charge of the storage battery is to reach the predetermined state of charge, the control processor 14B may perform control to set the charging mode of the charger 30 to the normal charging mode.

In contrast, when the determiner 13A determines that the state of charge of the storage battery is not to reach the predetermined state of charge, the control processor 14B may perform control to set the charging mode of the charger 30 to the quick charging mode.

In some embodiments, when the queuing vehicle is detected, the control processor 14B may perform control to set the charging mode of the charger 30 to the quick charging mode.

When the control processor 14B receives the data indicating that the queuing vehicle has been detected from the queuing vehicle detector 16, the control processor 14B may transmit the instruction to charge the storage battery in the quick charging mode to the charger 30 through the bus line BL.

Note that when the control processor 14B receives the data indicating that the queuing vehicle has been detected from the queuing vehicle detector 16 in a period before the state of charge of the storage battery reaches the predetermined state of charge, the control processor 14B may transmit the instruction to charge the storage battery in the quick charging mode to the charger 30.

<Process to be Executed by Charging Device 1B>

A process to be executed by the charging device 1B will be described with reference to FIG. 6.

The control processor 14B may determine whether the charging cable has been coupled to the vehicle (step S110).

When it is determined that the charging cable has not been coupled to the vehicle ("NO" in step S110), the control processor 14B may cause the process to return and shift to a standby mode.

In contrast, when the control processor 14B determines that the charging cable has been coupled to the vehicle ("YES" in step S110), the vehicle data obtainer 12 may acquire the data on the vehicle from the vehicle (step S120).

The reservation data obtainer 15 may acquire the usage reservation data from the server (step S210), and cause the process to shift to step S130.

The determiner 13A may refer to the data acquired in steps S120 and S210, and determine whether the predetermined state of charge is to be reached (step S130).

When the determiner 13A determines that the predetermined state of charge is to be reached ("YES" in step S130), the control processor 14B may transmit the instruction to charge the storage battery in the normal charging mode to the charger 30 (step S140), and cause the process to shift to step S310.

In contrast, when the determiner 13A determines that the predetermined state of charge is not to be reached ("NO" in step S130), the control processor 14B may transmit the instruction to charge the storage battery in the quick charging mode to the charger 30 (step S150), and cause the process to shift to step S310.

The control processor 14B may determine whether the data indicating that the queuing vehicle is present has been received from the queuing vehicle detector 16 (step S310).

When the control processor 14B determines that the data indicating that the queuing vehicle is present has not been received from the queuing vehicle detector 16 ("NO" in step S310), the control processor 14B may end the process.

In contrast, when the control processor 14B determines that the data indicating that the queuing vehicle is present has been received from the queuing vehicle detector 16 ("YES" in step S310), the control processor 14B may transmit the instruction to charge the storage battery in the quick charging mode to the charger 30 (step S320), and end the process.

Workings and Example Effects

In some embodiments, the charging device 1B may include the queuing vehicle detector 16 that detects the queuing vehicle, and the control processor 14B may perform control to set the charging mode of the charger 30 to the quick charging mode when the queuing vehicle is detected.

For example, when the queuing vehicle is present, the control processor 14B may perform control to set the charging mode of the charger 30 to the quick charging mode to cause the state of charge of the storage battery of the vehicle currently being charged to reach the predetermined state of charge faster.

Accordingly, a waiting time of the queuing vehicle may be shortened. This helps to reduce the number of queuing vehicles.

Further, the storage battery may be charged in the normal charging mode when: the queuing vehicle detector 16 detects no queuing vehicle; and the determiner 13A determines that the state of charge of the storage battery is to reach the predetermined state of charge. This helps to suppress deterioration of the storage battery.

Fourth Example Embodiment

The charging device 1C according to a fourth example embodiment will be described with reference to FIGS. 7 and 8.

Components denoted with the same reference numerals as those in the first example embodiment and the second example embodiment may have similar operations, and detailed descriptions thereof will be omitted.

<Configuration of Charging Device 1C>

Figure 7:
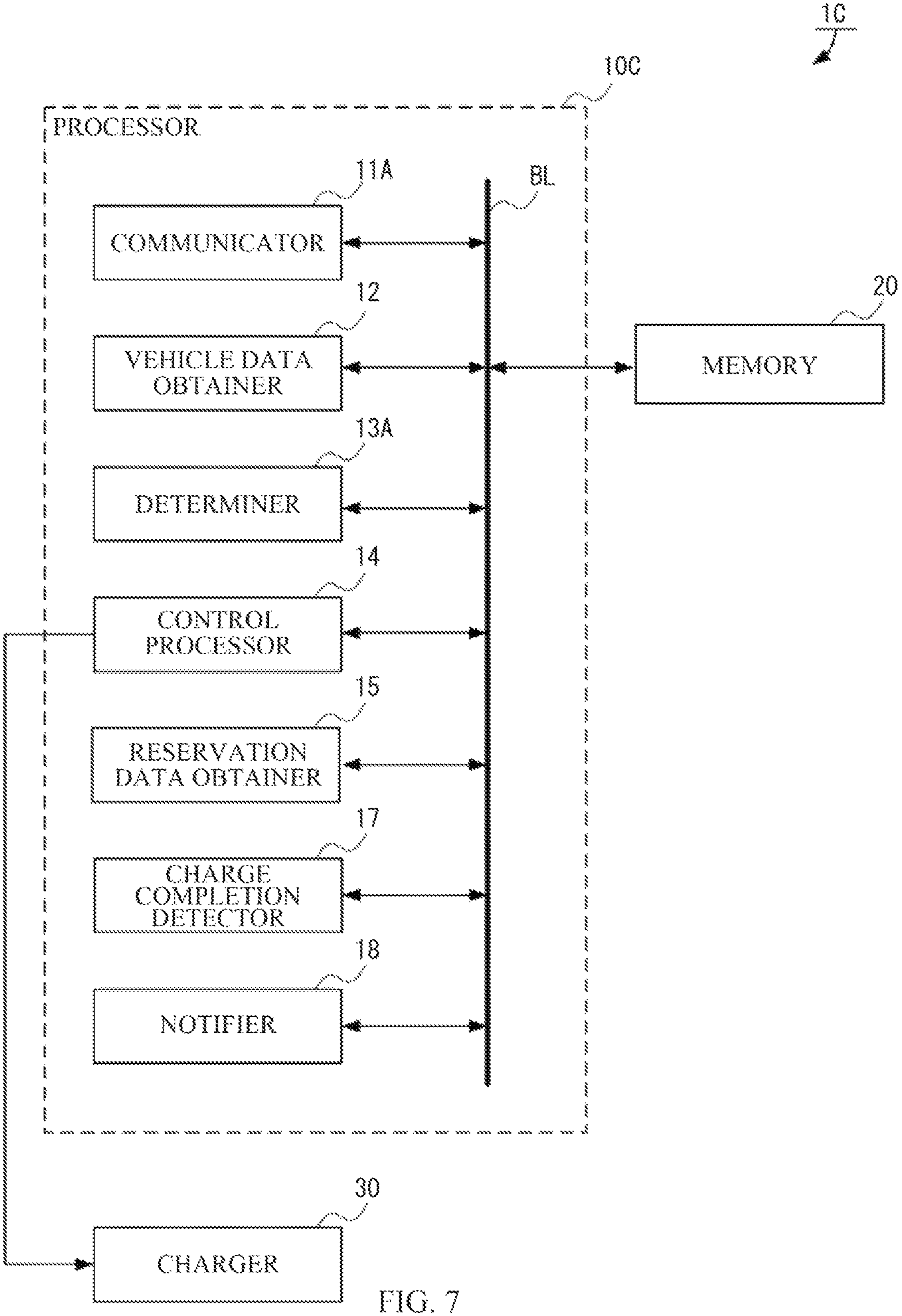
FIG. 7 is a diagram illustrating a configuration of a charging device according to one example embodiment of the disclosure.
Figure 8:
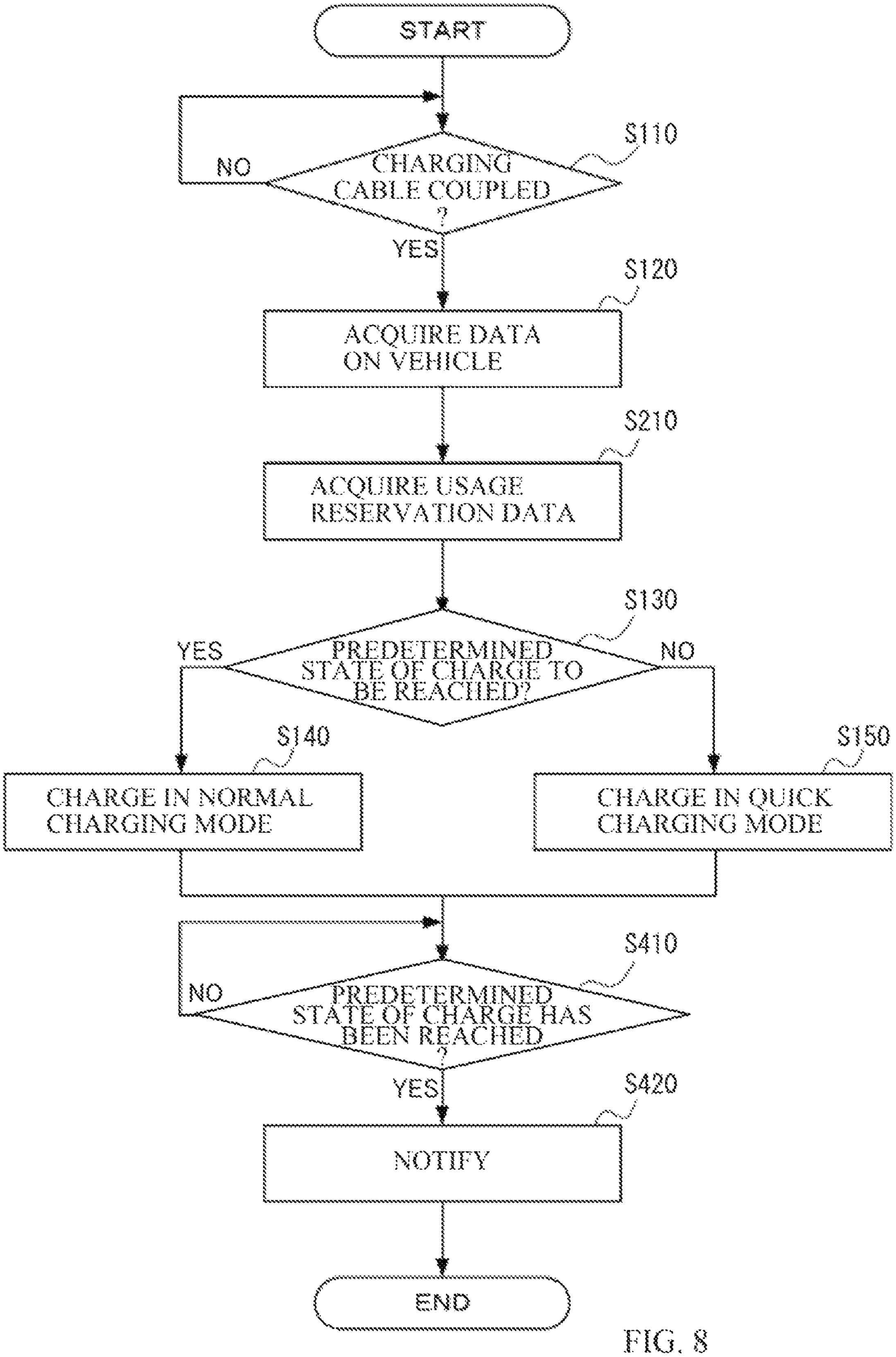
FIG. 8 is a flowchart illustrating a process to be executed by the charging device illustrated in FIG. 7.

As illustrated in FIG. 7, the charging device 1C according to the fourth example embodiment may include a processor 10C, the memory 20, and the charger 30.

<Configuration of Processor 10C>

The processor 10C may include the communicator 11A, the vehicle data obtainer 12, the determiner 13A, the control processor 14, the reservation data obtainer 15, a charge completion detector 17, and a notifier 18.

The charge completion detector 17 may detect that the state of charge of the storage battery has reached the predetermined state of charge.

The charge completion detector 17 may refer to the data on the vehicle, such as the current charge amount and the current state of charge, acquired by the vehicle data obtainer 12, and detect that the state of charge of the storage battery has reached the predetermined state of charge.

When the charge completion detector 17 detects that the state of charge of the storage battery has reached the predetermined state of charge, the charge completion detector 17 may transmit data indicating that the predetermined state of charge has been reached to the notifier 18, which will be described later, through the bus line BL.

When the charge completion detector 17 detects that the state of charge of the storage battery has reached the predetermined state of charge, the notifier 18 may notify one or both of the vehicle and the user of the vehicle of information on a request to move the vehicle.

When the notifier 18 receives the data indicating that the predetermined state of charge has been reached from the charge completion detector 17, the notifier 18 may transmit, for example, a message regarding the request to move the vehicle out of a charging area to the smartphone carried by the user through the communicator 11A.

For example, the notifier 18 may transmit, to the user of the vehicle, a message as follows: "Charging has been completed, please move the vehicle."

Note that the notifier 18 may be coupled to the vehicle through the communicator 11A, acquire data such as a telephone number or an e-mail address of the smartphone of the user registered in the vehicle, and transmit the message as described above.

Additionally, the notifier 18 may check the data on the vehicle stored in the memory 20, and when the vehicle that has been charged is the automated driving vehicle, notify the vehicle of a request for control to move out of the charging area through the communicator 11A. In one embodiment, the charge completion detector 17 may serve as a "charge completion detector". In one embodiment, the notifier 18 may serve as a "notifier".

<Process to be Executed by Charging Device 1C>

A process to be executed by the charging device 1C will be described with reference to FIG. 8.

The control processor 14 may determine whether the charging cable has been coupled to the vehicle (step S110).

When it is determined that the charging cable has not been coupled to the vehicle ("NO" in step S110), the control processor 14 may cause the process to return and shift to a standby mode.

In contrast, when the control processor 14 determines that the charging cable has been coupled to the vehicle ("YES" in step S110), the vehicle data obtainer 12 may acquire the data on the vehicle from the vehicle (step S120).

The reservation data obtainer 15 may acquire the usage reservation data from the server (step S210), and cause the process to shift to step S130.

The determiner 13A may refer to the data acquired in steps S120 and S210, and determine whether the predetermined state of charge is to be reached (step S130).

When the determiner 13A determines that the predetermined state of charge is to be reached ("YES" in step S130), the control processor 14 may transmit the instruction to charge the storage battery in the normal charging mode to the charger 30 (step S140), and cause the process to shift to step S410.

In contrast, when the determiner 13A determines that the predetermined state of charge is not to be reached ("NO" in step S130), the control processor 14 may transmit the instruction to charge the storage battery in the quick charging mode to the charger 30 (step S150), and cause the process to shift to step S410.

The notifier 18 may determine whether the data indicating that the state of charge has reached the predetermined state of charge has been received from the charge completion detector 17 (step S410).

When the notifier 18 determines that the data indicating that the state of charge has reached the predetermined state of charge has not been received from the charge completion detector 17 ("NO" in step S410), the notifier 18 may cause the process to return and shift to a standby mode.

In contrast, when it is determined that the data indicating that the state of charge has reached the predetermined state of charge has been received from the charge completion detector 17 ("YES" in step S410), the notifier 18 may make a notification of information regarding the request to move the vehicle (step S420), and end the process.

Workings and Example Effects

In some embodiments, the charging device 1C may include the charge completion detector 17 and the notifier 18. The charge completion detector 17 may detect that the state of charge of the storage battery has reached the predetermined state of charge. The notifier 18 may notify one or both of the vehicle and the user of the vehicle of the information regarding the request to move the vehicle when the charge completion detector 17 detects that the state of charge of the storage battery has reached the predetermined state of charge.

This helps to prompt the user to move the vehicle even when the user is not in the vicinity of the charging area.

Further, when the vehicle that has been charged is an automated driving vehicle, it is possible to cause the vehicle to quickly move out of the charging area by notifying the vehicle of the request for the control to move out of the charging area.

Further, when the queuing vehicle is present, it is possible for the queuing vehicle to quickly start charging. This helps to reduce the number of queuing vehicles.

Modification Example 1

When the determiner 13 or 13A determines that the state of charge of the storage battery is to reach the predetermined state of charge, the control processor 14 of the charging device 1 or 1A according to the example embodiments described above may start charging the storage battery in the normal charging mode upon the determination. In some embodiments, before starting to charge in the normal charging mode, consent of the user may be obtained on charging the storage battery in the normal charging mode by displaying, on a non-illustrated display, information on the difference between the normal charging mode and the quick charging mode. Non-limiting examples of the information may include information on time to be taken to reach the predetermined state of charge, a usage fee, and an occurrence of deterioration of the storage battery. Thereafter, the charging may be started.

For example, when the consent of the user is not obtained on charging the storage battery in the normal charging mode, the control processor 14 may start charging the storage battery in the quick charging mode.

This makes it possible, for example, for the user to select charging of the storage battery in the quick charging mode when the user does not have much time.

Modification Example 2

The determiner 13 of the charging device 1 according to the example embodiments described above may fix the available time period (for example, 20 minutes) and determine whether the state of charge of the storage battery is to reach the predetermined state of charge. In some embodiments, during a time period in which the number of queuing vehicles is assumed to decrease, the available time period may be set to a long time (for example, 30 minutes). With this setting, it may be determined whether the state of charge of the storage battery is to reach the predetermined state of charge.

Accordingly, during the time period in which the number of queuing vehicles is assumed to decrease, chances to be charged in the normal charging mode increase. This helps to suppress deterioration of the storage battery.

In some embodiments, it is possible to implement the charging device 1, 1A, 1B, or 1C of the example embodiment of the disclosure by recording the process to be executed by the determiner 13 or 13A and the control processor 14 or 14B on a non-transitory recording medium readable by a computer system, and causing the computer system to load the program recorded on the non-transitory recording medium onto the memory to execute the program.

The computer system as used herein may encompass an operating system (OS) and a hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above.

The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the determiners 13 and 13A and the control processors 14 and 14B illustrated in FIGS. 1, 3, and 5 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the determiners 13 and 13A and the control processors 14 and 14B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the determiners 13 and 13A and the control processors 14 and 14B illustrated in FIGS. 1, 3, and 5.

The invention claimed is:

1. A charging device comprising:

a charger configured to charge a storage battery of a vehicle in a normal charging mode or a quick charging mode, and to switch between the normal charging mode and the quick charging mode;

a vehicle data obtainer configured to acquire data on the vehicle, the data on the vehicle including a charge amount at a time of full charge, a current remaining charge amount, and a current state of charge of the storage battery;

a determiner configured to determine, based on the data on the vehicle, whether the storage battery is to reach a predetermined state of charge within an available time period for charging the storage battery in the normal charging mode;

a vehicle detector configured to detect a queuing vehicle; and a control processor configured to:

set a charging mode of the charger to the normal charging mode or the quick charging mode;

set the charging mode of the charger to the normal charging mode when the determiner determines that the storage battery is to reach the predetermined state of charge within the available time period for charging the storage battery in the normal charging mode; and switch the charging mode of the charger from the normal charging mode to the quick charging mode while the storage battery is being charged in the normal charging mode when the vehicle detector detects the queuing vehicle in a period before the state of charge of the storage battery reaches the predetermined state of charge.

2. The charging device according to claim 1, further comprising a reservation data obtainer configured to acquire usage reservation data for the charging device, wherein the available time period is determined based on the usage reservation data.

3. The charging device according to claim 2, further comprising:

a charge completion detector configured to detect that the state of charge of the storage battery has reached the predetermined state of charge; and a notifier configured to notify one or both of the vehicle and a user of the vehicle of information regarding a request to move the vehicle when the charge completion detector detects that the state of charge of the storage battery has reached the predetermined state of charge.

4. The charging device according to claim 3, wherein the notifier is configured to transmit, to a smartphone carried by the user, a message regarding the request to move the vehicle out of a charging area.

5. The charging device according to claim 2, wherein the available time period is a time period from a current time to a usage start time of a next user.

6. The charging device according to claim 2, wherein the determiner is configured to determine whether the storage battery is to reach the predetermined state of charge based on the data on the vehicle acquired by the vehicle data obtainer and a usage start time of a next user included in the usage reservation data.

7. The charging device according to claim 1, further comprising:

a charge completion detector configured to detect that the state of charge of the storage battery has reached the predetermined state of charge; and a notifier configured to notify one or both of the vehicle and a user of the vehicle of information regarding a request to move the vehicle when the charge completion detector detects that the state of charge of the storage battery has reached the predetermined state of charge.

8. The charging device according to claim 1, wherein the determiner is configured to set the available time period to a fixed available time period, and wherein, in a time period in which a number of queuing vehicles is assumed to decrease, the determiner is configured to set the available time period to be longer than the fixed available time period.

9. A charging device comprising:

one or more processors;

one or more memories communicably coupled to the one or more processors; and a charger configured to charge a storage battery of a vehicle in a normal charging mode or a quick charging mode, and to switch between the normal charging mode and the quick charging mode, wherein the one or more processors are configured to;

acquire data on the vehicle, the data on the vehicle including a charge amount at a time of full charge, a current remaining charge amount, and a current state of charge of the storage battery;

determine, based on the data on the vehicle, whether the storage battery is to reach a predetermined state of charge within an available time period for charging the storage battery in the normal charging mode;

detect a queuing vehicle;

set a charging mode of the charger to the normal charging mode or the quick charging mode;

set the charging mode of the charger to the normal charging mode when the state of charge of the storage battery is determined to reach the predetermined state of charge within the available time period for charging the storage battery in the normal charging mode; and switch the charging mode of the charger from the normal charging mode to the quick charging mode while the storage battery is being charged in the normal charging mode when the one or more processors detect the queuing vehicle in a period before the state of charge of the storage battery reaches the predetermined state of charge.

* * * * *